(12) United States Patent
Mannheim Astete et al.

(10) Patent No.: US 11,697,271 B2
(45) Date of Patent: Jul. 11, 2023

(54) LAMINATED GLAZING WITH A SWITCHABLE LIQUID CRYSTAL LAYER

(71) Applicant: AGP America S.A., Ciudad de Panama (PA)

(72) Inventors: Mario Arturo Mannheim Astete, Lima (PE); Andres Fernando Sarmiento Santos, Lima (PE); Natalia Andrea Rueda Guerrero, Lima (PE); Laura Granados Caro, Lima (PE)

(73) Assignee: AGP America S.A., Panama (PA)

( * ) Notice: Subject to any disclaimer, the term of this patent is extended or adjusted under 35 U.S.C. 154(b) by 0 days.

(21) Appl. No.: 17/256,638

(22) PCT Filed: Jun. 28, 2019

(86) PCT No.: PCT/IB2019/055536
§ 371 (c)(1),
(2) Date: Dec. 28, 2020

(87) PCT Pub. No.: WO2020/003252
PCT Pub. Date: Jan. 2, 2020

(65) Prior Publication Data
US 2021/0138767 A1    May 13, 2021

Related U.S. Application Data

(60) Provisional application No. 62/692,445, filed on Jun. 29, 2018.

(51) Int. Cl.
*B32B 17/10* (2006.01)
*B32B 7/12* (2006.01)
(Continued)

(52) U.S. Cl.
CPC .......... *B32B 17/10504* (2013.01); *B32B 7/12* (2013.01); *B32B 17/10045* (2013.01);
(Continued)

(58) Field of Classification Search
CPC ........ B32B 17/10293; B32B 17/10302; B32B 17/10467–10532; B60J 3/04; G02F 1/1339–13398
See application file for complete search history.

(56) References Cited

U.S. PATENT DOCUMENTS 6,583,848 B2 * 6/2003 Hashimoto ....... B32B 17/10733
349/190
2006/0057312 A1 * 3/2006 Watanabe ......... B32B 17/10486
428/34

(Continued)

FOREIGN PATENT DOCUMENTS

WO WO-2017071911 A * 5/2017 ............ B60W 40/12
WO WO-2017071911 A1 * 5/2017 ............ B60W 40/12

OTHER PUBLICATIONS

Technical Glossary entry on Optical Bonding, from Taica; https://taica.co.jp/gel/en/support/technical_terms/term_008.html (Year: 2022).*

(Continued)

*Primary Examiner* — Z. Jim Yang
(74) *Attorney, Agent, or Firm* — The Morales Law Firm; Joseph L. Morales

(57) ABSTRACT

A switchable laminated glazing comprising two stacks of components with different lamination parameters, a first stack of components which provides the mechanical protection of the glazing, and a second stack of components with variable light transmission.

19 Claims, 4 Drawing Sheets

(51) Int. Cl.
    *B60J 3/00*         (2006.01)
    *B60J 1/00*         (2006.01)
    *B60J 1/08*         (2006.01)
    *B60J 3/04*         (2006.01)

(52) U.S. Cl.
CPC .. *B32B 17/10174* (2013.01); *B32B 17/10302* (2013.01); *B32B 17/10321* (2013.01); *B32B 17/10348* (2013.01); *B32B 17/10761* (2013.01); *B32B 17/10889* (2013.01); *B60J 1/001* (2013.01); *B60J 3/007* (2013.01); *B32B 2305/55* (2013.01); *B32B 2605/006* (2013.01); *B60J 1/08* (2013.01); *B60J 3/04* (2013.01)

(56) References Cited

U.S. PATENT DOCUMENTS

| | | | |
|---|---|---|---|
| 2012/0026573 A1* | 2/2012 | Collins | B32B 17/10908 29/829 |
| 2013/0229612 A1* | 9/2013 | Gayout | G02F 1/1339 349/193 |
| 2013/0265511 A1* | 10/2013 | Poix | B32B 17/10045 349/33 |
| 2014/0176836 A1* | 6/2014 | Brecht | G02F 1/13718 349/16 |
| 2014/0295150 A1* | 10/2014 | Bower | B32B 15/085 428/201 |
| 2015/0301367 A1* | 10/2015 | Mennig | B32B 17/10761 156/60 |
| 2015/0331296 A1* | 11/2015 | Mennig | B32B 17/10036 156/99 |
| 2016/0004356 A1* | 1/2016 | Ogikubo | G06F 3/0446 345/174 |
| 2016/0082812 A1* | 3/2016 | Okuda | B32B 17/10302 49/323 |
| 2016/0138328 A1* | 5/2016 | Behmke | B32B 17/10036 359/275 |
| 2016/0170245 A1* | 6/2016 | Zhang | G06F 1/1601 445/25 |
| 2016/0243773 A1* | 8/2016 | Wang | B32B 17/10917 |
| 2017/0347474 A1* | 11/2017 | Alonso | H05K 5/0217 |
| 2018/0328102 A1* | 11/2018 | Byker | B32B 17/10798 |
| 2019/0227357 A1* | 7/2019 | Williams | G02F 1/1339 |
| 2019/0241050 A1* | 8/2019 | Okabe | G02F 1/137 |
| 2019/0270284 A1* | 9/2019 | Couillard | B32B 7/12 |
| 2019/0366811 A1* | 12/2019 | O'Keeffe | B60W 40/02 |
| 2020/0057335 A1* | 2/2020 | Lee | G02B 26/02 |
| 2020/0201113 A1* | 6/2020 | Baierl | G02F 1/1333 |
| 2020/0319504 A1* | 10/2020 | Kim | B32B 27/285 |
| 2020/0379283 A1* | 12/2020 | Diguet | B60R 16/02 |
| 2021/0055463 A1* | 2/2021 | Lee | G02F 1/133528 |
| 2021/0103174 A1* | 4/2021 | Ishii | B32B 17/10005 |
| 2021/0252834 A1* | 8/2021 | Manz | B32B 17/10605 |

OTHER PUBLICATIONS

Technical Glossary entry on Optical Clear Adhesive, from Taica; https://taica.co.jp/gel/en/support/technical_terms/term_006.html (Year: 2022).*

Technical Glossary entry on Optical Clear Resin, from Taica; https://taica.co.jp/gel/en/support/technical_terms/term_007.html (Year: 2022).*

* cited by examiner

LAMINATED GLAZING WITH A SWITCHABLE LIQUID CRYSTAL LAYER

FIELD OF THE INVENTION

The present disclosed invention is directed to a laminated glazing having a switchable layer, and, more particularly, to a laminated glazing with a switchable liquid crystal layer.

BACKGROUND OF THE INVENTION

In response to the regulatory requirements for increased automotive fuel efficiency as well as the growing public awareness and demand for environmentally friendly products, automotive original equipment manufacturers, around the world, have been working to improve the efficiency of their vehicles.

One of the key elements of this strategy to improve efficiency has been the concept of light weighting. Often, more traditional, less expensive, conventional materials and processes are being replaced by innovative new materials and processes which while sometime being more expensive, still have higher utility than the materials and processes being replaced due to their lower weight and the corresponding increase in fuel efficiency. Sometimes, the new materials and processes bring with them added functionality as well in addition to their lighter weight. Vehicle glazing has been no exception.

The glazed area of vehicles has been steadily increasing and, in the process, displacing other heavier materials. The popular large glass panoramic roofs are just one example of this trend. A panoramic roof is a vehicle roof glazing which comprises a substantial area of the roof over at least a portion of both the front and rear seating areas of the vehicle. A panoramic roof may be laminated or monolithic.

Due to the lower cost and higher strength of tempered glass, tempered glass has been favored for all but the windshield position where tempered glass is not permitted. However, on some higher end vehicles, laminated glass has been used for the windows rather than tempered glass. This is at least in part because a laminated glass can make use of functional films. The uses for these films include but are not limited to: solar control, variable light transmission, increased stiffness, increased structural integrity, improved penetration resistance, improved occupant retention, providing a barrier, tint, providing a sunshade, color correction, and as a substrate for functional and aesthetic graphics.

To control the level of light transmission through the laminate, there are many technologies available: electrochromic, photochromic, thermochromic and electric field sensitive films which are designed to be incorporated into laminated glass. Of interest are liquid crystal (LC) films which can quickly change their light transmittance in response to an electrical field.

In a liquid crystal film, liquid crystals are sandwiched between two transparent polymeric substrates. Spacers are used to keep a gap between substrates in order to liquid crystals maintain its orientation. The film is then laminated between two or more glass layers. If the LC film is normally opaque, when power is applied to the film the liquid crystals line up and the glass window is clear, and when the power is turned off, the liquid crystals return to their normal positions and turns the glass window from clear to opaque. On the contrary, if the LC film is normally clear, the glass window becomes opaque when the power is applied.

One of the problems faced when laminating a switchable glazing with a LC film comes from the different optimal lamination parameters required for some of the components in the stack, i.e. lamination have to be performed under a range of pressures and temperatures to obtain good adhesion to the glass substrates while not compromising other functional characteristics on the glazing. For example, liquid crystal film deformation, and consequent optical defects, may be present due to polymeric substrate deformation when laminated it in a standard lamination process. When the orientation of liquid crystals is changed because of a permanent deformation, a zone with different colors appears.

It would be advantageous to be able to produce a laminated glazing with a switchable liquid crystal layer in a more efficient manner.

SUMMARY OF THE INVENTION

In this sense, it is an object of the present invention to provide a laminated glazing having a switchable liquid crystal layer without optical defects but still complying with automotive safety standards.

This object can be attained by a switchable laminated glazing comprising two stacks of components, a first stack of components and a second stack of components. The first stack of components comprises an exterior glass layer and an intermediate glass layer, both of them having inner and outer surfaces. At least one plastic bonding layer is located between inner surfaces of said exterior and interior glass layers. The second stack of components comprises an interior glass layer having inner and outer surfaces, a first optically clear adhesive, and a liquid crystal layer. This second stack of components is disposed on and bonded to the first stack of components by said first optically clear adhesive, such that the liquid crystal layer is sandwiched between the outer surface of the intermediate glass layer and the inner surface of the interior glass layers with the first optically clear adhesive.

BRIEF DESCRIPTION OF THE DRAWINGS

These features and advantages of the present invention will become apparent from the detailed description of the following embodiments in conjunction with the accompanying drawings, wherein.

DETAILED DESCRIPTION OF THE INVENTION

Figure 1:
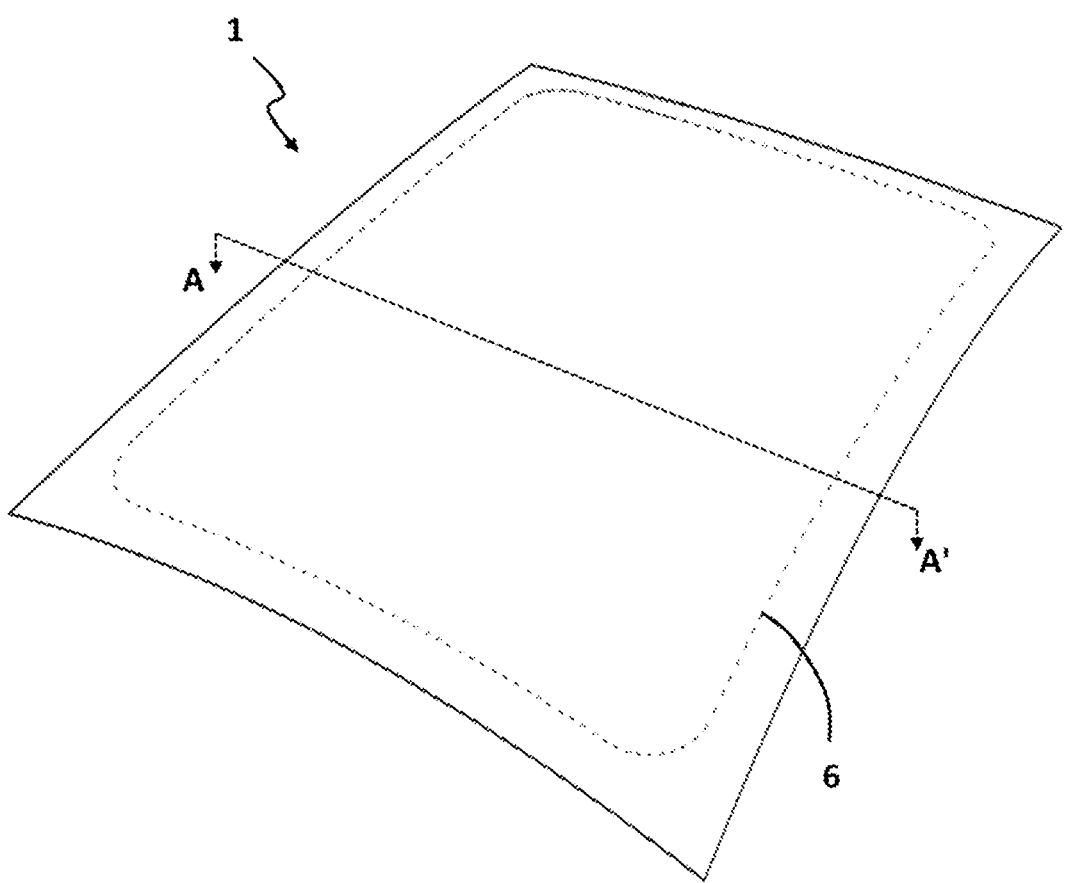
FIG. 1 shows an isometric view of a laminated glazing according to an embodiment of the present invention.

Referring now to the drawings, there are shown preferred embodiments of the laminated glazing with a switchable liquid crystal layer according to the present invention.

Figure 2:
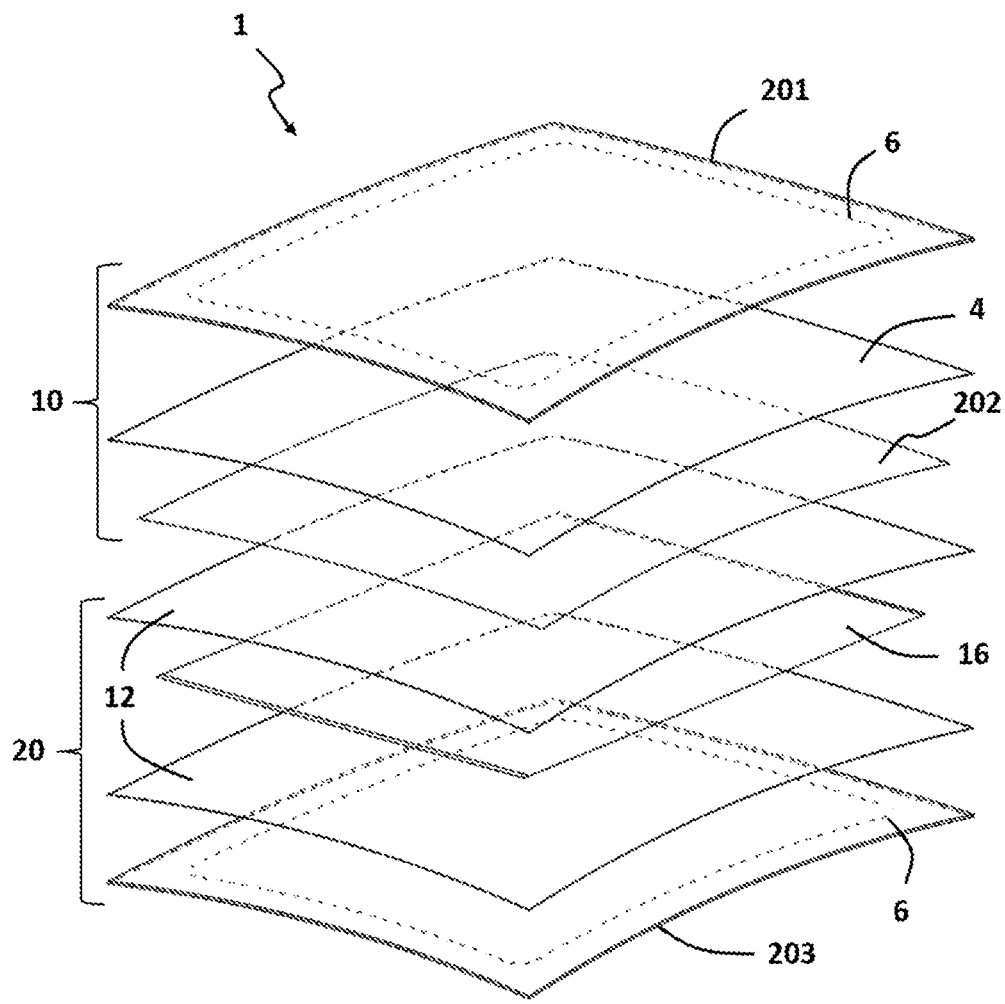
FIG. 2 shows an exploded view of the laminated glazing of FIG. 1.
Figure 3:
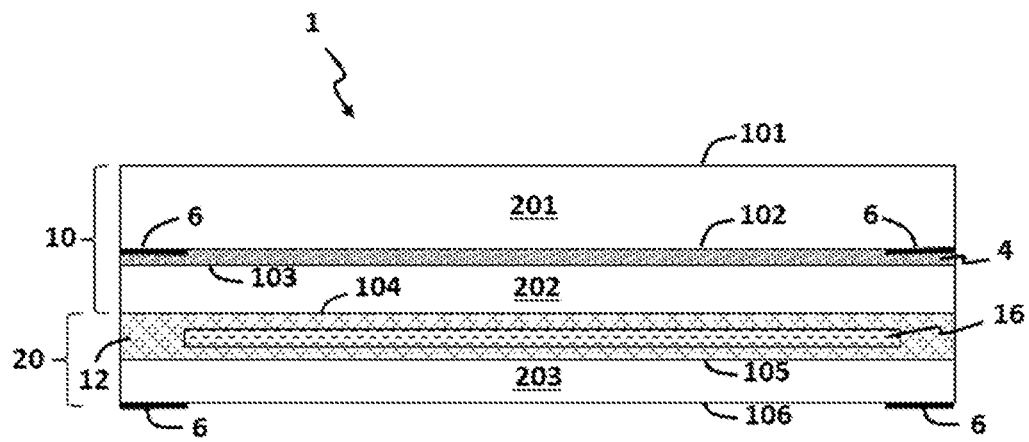
FIG. 3 shows a cross sectional view A-A' of the laminated glazing of FIG. 1.

FIGS. 1, 2 and 3 show a roof window 1 with a switchable liquid crystal layer having a first stack of components 10 and a second stack of components 20. The first stack of components 10 comprises exterior 201 and intermediate 202 glass layers bonded to each other by a plastic bonding layer 4 (interlayer), which is located between inner surfaces 102, 103 of said glass layers 201, 202. In this embodiment, the plastic bonding layer 4 is polyvinyl butyral (PVB), which has excellent adhesion to glass and is optically clear once laminated. The assembled stack 8 is loaded into a vacuum bag, and then placed in an autoclave for lamination.

In other embodiments, the plastic bonding layer can be ethylene vinyl acetate (EVA), thermoplastic polyurethane (TPU) or another standard lamination bonding layer. Additionally, interlayers are available with enhanced capabilities beyond bonding glass layers together. Some embodiments include plastic bonding layers having solar attenuating properties such as high UV absorption, high IR absorption or both high UV and IR absorption.

Again, in FIGS. 1, 2, 3, the second stack of components 20 comprises an interior glass layer 203 having inner 105 and outer 106 surfaces, a first optically clear adhesive 12, and a liquid crystal layer 16. According to this embodiment, the liquid crystal layer 16 is embedded in a suitable liquid optically clear adhesive 12 curable to the solid state, and sandwiched between the outer surface 104 of the intermediate glass layer 202 and the inner surface 105 of the interior glass layers 203, such that after curing the liquid optically clear adhesive, the second stack of components 20 is bonded to the first stack of components 10 by said liquid adhesive 12.

Figure 4:
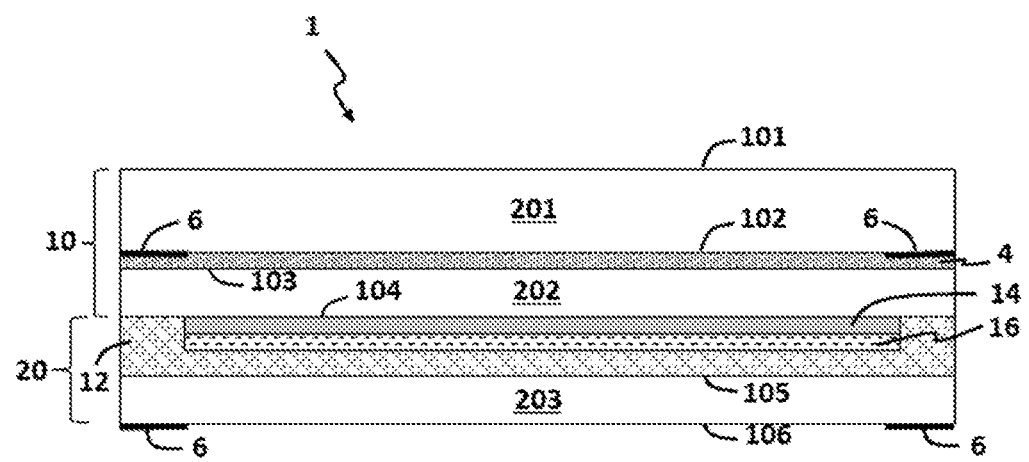
FIG. 4 shows a cross sectional view A-A' of the laminated glazing of FIG. 1 according to an alternative embodiment.

In an alternative embodiment, shown in FIG. 4, the second stack of components 20 is bonded to the first stack in other ways. The liquid crystal layer 16 is fixed before the application of the first optically clear adhesive 12, to the outer surface 104 of the intermediate glass layer 202 with a second optically clear adhesive 14, that may or may not be curable, to hold the liquid crystal layer 16 in place. Then, the first optically clear adhesive 12 is incorporated into the second stack of components 20, such that the latter is bonded to the first stack of components 10 by said first optically clear adhesive 12. It is understood that in this alternative embodiment, the liquid crystal layer 16 may be fixed to the inner surface 105 of the interior glass layer 203 instead.

In several embodiments, each of the first and second optically clear adhesives 12, 14 are selected from the group consisting of a liquid optically clear adhesive which is cured by exposing it to ultraviolet (UV) light, temperature, moisture, by a chemical reaction, or other curing methods, a UV curable resin, polymer, silicone, acrylic, urethane, sulfide based, or combinations thereof.

An obscuration 6 is disposed on inner surface 102 of exterior glass layer 201 and outer surface 106 of interior glass layer 203.

Figure 5:
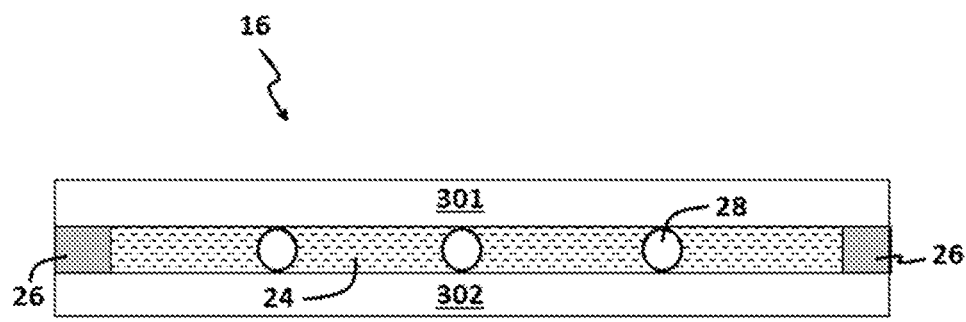
FIG. 5 shows a cross sectional view of a liquid crystal film according to an embodiment of the present invention.

FIG. 5 shows a cross sectional view of a liquid crystal layer 16 having liquid crystals 24 encapsulated between two confronting polymeric substrates 301, 302. An edge seal 26 is used to cover the edge of substrates 301, 302, such that the liquid crystals 24 get trapped between said substrates. Additionally, spacers 28 are distributed along surface substrates 301, 302 to maintain a gap ranging from 6 to 15 µm depending on the liquid crystal's formulation.

Figure 6:
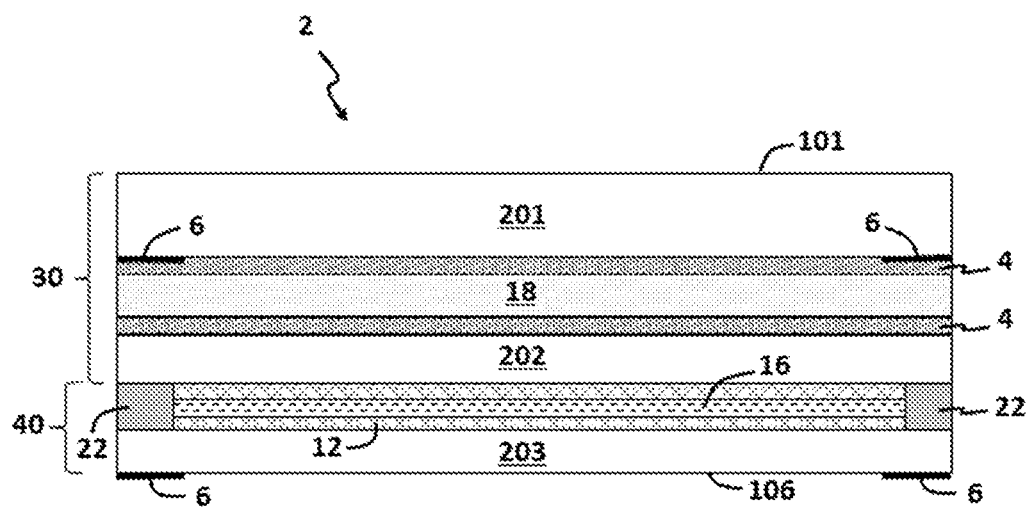
FIG. 6 shows a cross sectional view of a laminated glazing with a performance film according to an embodiment of the present invention.

FIG. 6 shows a cross sectional view of a vehicle glazing 2 having a first stack of components 30 and a second stack of components 40. In the first stack of components 30, a performance layer 18 is sandwiched between an exterior glass layer 201 and an intermediate glass layer 202. Two plastic bonding layers 4 are used on each side of the performance layer 18 to bond said performance layer 18 to glass layers 201, 202. Obscuration 6 is applied on the inner surface 102 of the exterior glass layer 201. The first stack of components 30 is then laminated.

One of the big advantages of a laminated glazing over a tempered monolithic glazing is that a laminate can make use of performance coatings and films. A wide variety of films or coatings are available that can be incorporated into a laminate. The uses for these films or coatings include but are not limited to: solar control, variable light transmission, increased stiffness, increased structural integrity, improved penetration resistance, improved occupant retention, providing a barrier, tint, providing a sunshade, and color correction, among others. In some embodiments the performance layer is selected from the group consisting of UV reflective film, IR reflective film, and UV and IR reflective film. In alternative embodiments, a performance layer is a low emissivity coating disposed on the inner surface of the exterior glass layer.

Again in FIG. 6, the second stack of components 40 has the same configuration as that of the embodiment depicted in FIGS. 1, 2, 3, 4, with the exception that additionally comprises a perimeter seal 22 to keep a gap between the intermediate glass layer 202 and the interior glass layer 203.

In some embodiments, including those mentioned above, the exterior glass layer 201 is either a soda-lime glass or a borosilicate glass, and both intermediate 202 and interior 203 glass layers are either soda-lime, borosilicate, or aluminosilicate glass. In several embodiments, glass layers 201, 202, 203 are at least 0.5 mm thick, preferably the exterior glass layer 201 is at least 1.5 mm thick, more preferably the exterior glass layer 201 is at least 2 mm thick. Furthermore, in several embodiments, the laminated glazing is a curved glazing, wherein the exterior glass layer is formed using gravity bending, press bending, cold bending or any other conventional means known in the art. Likewise, in several embodiments, intermediate and interior glass layers are cold bent glass. Additionally, in some embodiments, the switchable laminated glazing is a side window.

It must be understood that this invention is not limited to the embodiments described and illustrated above. A person skilled in the art will understand that numerous variations and/or modifications can be carried out that do not depart from the spirit of the invention, which is only defined by the following claims.

The invention claimed is:

1. A switchable laminated glazing, comprising:
   a first stack of components having:
      an exterior glass layer having inner and outer surfaces;
      an intermediate glass layer having inner and outer surfaces; and
      at least one plastic bonding layer located between inner surfaces of said exterior and intermediate glass layers; and
   a second stack of components having:
      an interior glass layer having inner and outer surfaces;
      a first cured liquid optically clear adhesive; and
      a liquid crystal layer;
   wherein the second stack of components is disposed on and bonded to the first stack of components by said first cured liquid optically clear adhesive, such that the liquid crystal layer is sandwiched between the outer surface of the intermediate glass layer and the inner surface of the interior glass layers with the first cured liquid optically clear adhesive;
   wherein the first cured liquid optically clear adhesive and the liquid crystal layer are located within a sealed space, said sealed space defined by and sealed exclusively by the intermediate glass layer, the interior glass layer, and a perimeter seal, and wherein the perimeter seal is located between and directly contacts the intermediate and interior glass layers;

wherein the liquid crystal layer comprises liquid crystals, two confronting polymeric substrates to encapsulate said liquid crystal layer, an edge seal and spacers;

wherein the laminated glazing is a vehicle roof or vehicle side window; and wherein the switchable laminate glazing is curved.

2. The switchable laminated glazing of claim 1, wherein the edge seal and spacers of the liquid crystal layers are distributed along the surface substrates to maintain a gap between thereof.

3. The switchable laminated glazing of claim 1, wherein the gap between substrates of the liquid crystal layer ranges from about 6 μm to about 15 μm.

4. The switchable laminated glazing of claim 1, wherein said at least one plastic bonding layer is selected from the group consisting of polyvinyl butyral, ethylene vinyl acetate, and thermoplastic polyurethane.

5. The switchable laminated glazing of claim 1, wherein at least one of the plastic bonding layer is selected from the group consisting of a plastic bonding layer with high UV absorption, a plastic bonding layer with high IR absorption, and a plastic bonding layer with high UV and IR absorption.

6. The switchable laminate glazing of claim 1, wherein the first liquid optically clear adhesive is cured using a combination of UV light and another mechanism selected from the group consisting of temperature, moisture and chemical reaction.

7. The switchable laminated glazing of claim 1, wherein the first liquid optically clear adhesive is a liquid optically clear adhesive with high UV absorption.

8. The switchable laminated glazing of claim 1 further comprising a second optically clear adhesive layer disposed between the liquid crystal layer and either the outer surface of the intermediate glass layer or the inner surface of the interior glass layer.

9. The switchable laminated glazing of claim 1, wherein the first stack further comprises a performance layer.

10. The switchable laminated glazing of claim 9, wherein the performance layer is selected from the group consisting of UV reflective film, IR reflective film, and UV and IR reflective film.

11. The switchable laminated glazing of claim 9, wherein the performance layer is a low emissivity coating disposed on the inner surface of the exterior glass layer.

12. A method of producing a switchable laminated glazing comprising the steps of:

providing an exterior, intermediate and interior glass layers having each of them inner and outer surfaces;

providing at least one plastic bonding layer;

providing a liquid crystal layer;

placing said at least one plastic bonding layer between the inner surfaces of the exterior and intermediate glass layers such that a first stack of components is assembled;

laminating said first stack of components using an autoclave lamination cycle;

placing a first liquid optically clear adhesive onto the inner surface of the interior glass layer;

disposing the outer surface of the intermediate glass layer against the inner surface of the interior glass layers such that the liquid crystal layer is sandwiched between them;

disposing a perimeter seal between and in direct contact with the intermediate glass layer and the interior glass layer; and curing the first liquid optically clear adhesive such that said first stack is permanently bonded to the interior glass layer and the components disposed in between such that a second stack of components is assembled;

wherein the first liquid optically clear adhesive once cured and the liquid crystal layer are located within a sealed space, said sealed space defined by and sealed exclusively by the intermediate glass layer, the interior glass layer, and the perimeter seal, wherein the liquid crystal layer comprises liquid crystals, two confronting polymeric substrates to encapsulate said liquid crystal layer, an edge seal and spacers;

wherein the laminated glazing is a vehicle roof or vehicle side window; and wherein the switchable laminate glazing is curved.

13. The method of producing a switchable laminated glazing of claim 12, wherein after the step of placing the first liquid optically clear adhesive onto the inner surface of the interior glass layer, the liquid crystal layer is embedded into said first liquid optically clear adhesive.

14. The method of producing a switchable laminated glazing of claim 12, wherein after the step of laminating the first stack of components, the liquid crystal layer is fixed to the outer surface of the intermediate glass layer by means of a second liquid optically clear adhesive.

15. The method of producing a switchable laminated glazing of claim 12, wherein said at least one plastic bonding layer is selected from the group consisting of polyvinyl butyral, ethylene vinyl acetate, and thermoplastic polyurethane.

16. The method of producing a switchable laminated glazing of claim 12, wherein at least one of the plastic bonding layer is selected from the group consisting of a plastic bonding layer with high UV absorption, a plastic bonding layer with high IR absorption, and a plastic bonding layer with high UV and IR absorption.

17. The method of producing a switchable laminated glazing of claim 12, wherein the first liquid optically clear adhesive is selected from the group consisting of UV curable resin, polymer, silicone, acrylic, urethane, sulfide based and combinations thereof.

18. The method of producing a switchable laminated glazing of claim 12, wherein the first liquid optically clear adhesive presents high UV absorption.

19. The method of producing a switchable laminated glazing of claim 14, wherein the second liquid optically clear adhesive is selected from the group consisting of UV curable resin, polymer, silicone, acrylic, urethane, sulfide based and combinations thereof.

* * * * *